United States Patent [19]

Berman

[11] 4,373,918
[45] Feb. 15, 1983

[54] AUDIO-VISUAL, CHILD-PARTICIPATING EDUCATIONAL ENTERTAINMENT CENTER

[75] Inventor: Mort Berman, Brooklyn, N.Y.

[73] Assignee: Avalon Industries, Inc., Brooklyn, N.Y.

[21] Appl. No.: 253,651

[22] Filed: Apr. 13, 1981

[51] Int. Cl.³ .................. G09B 5/06; A63H 33/14; G03B 21/10
[52] U.S. Cl. .................................. 434/307; 46/16; 353/28; 353/72; 353/104; 434/309
[58] Field of Search .................. 434/307, 309, 316; 46/16; 353/28, 72, 104

[56] References Cited

U.S. PATENT DOCUMENTS 3,568,356 3/1971 Berman ........................... 434/307
3,939,579 2/1976 Andrews et al. ................. 434/316
4,124,943 11/1978 Mitchell et al. .................. 434/307

*Primary Examiner*—William H. Grieb
*Attorney, Agent, or Firm*—Kirschstein, Kirschstein, Ottinger & Cobrin

[57] ABSTRACT

An audio-visual, child-participating, educational entertainment center, which provides a child with an educational entertainment device in which the child can actively participate, at his own pace, in an audio-visual feature. The educational entertainment center comprises a screen upon which visual images are projected, an animated audio-visual feature, a kit containing different types of appliques, the appliques being capable of integration with the audio-visual animated feature, and a switch to stop and restart the audio-visual feature at will, thus permitting the child to apply the applique means at his own pace.

9 Claims, 6 Drawing Figures

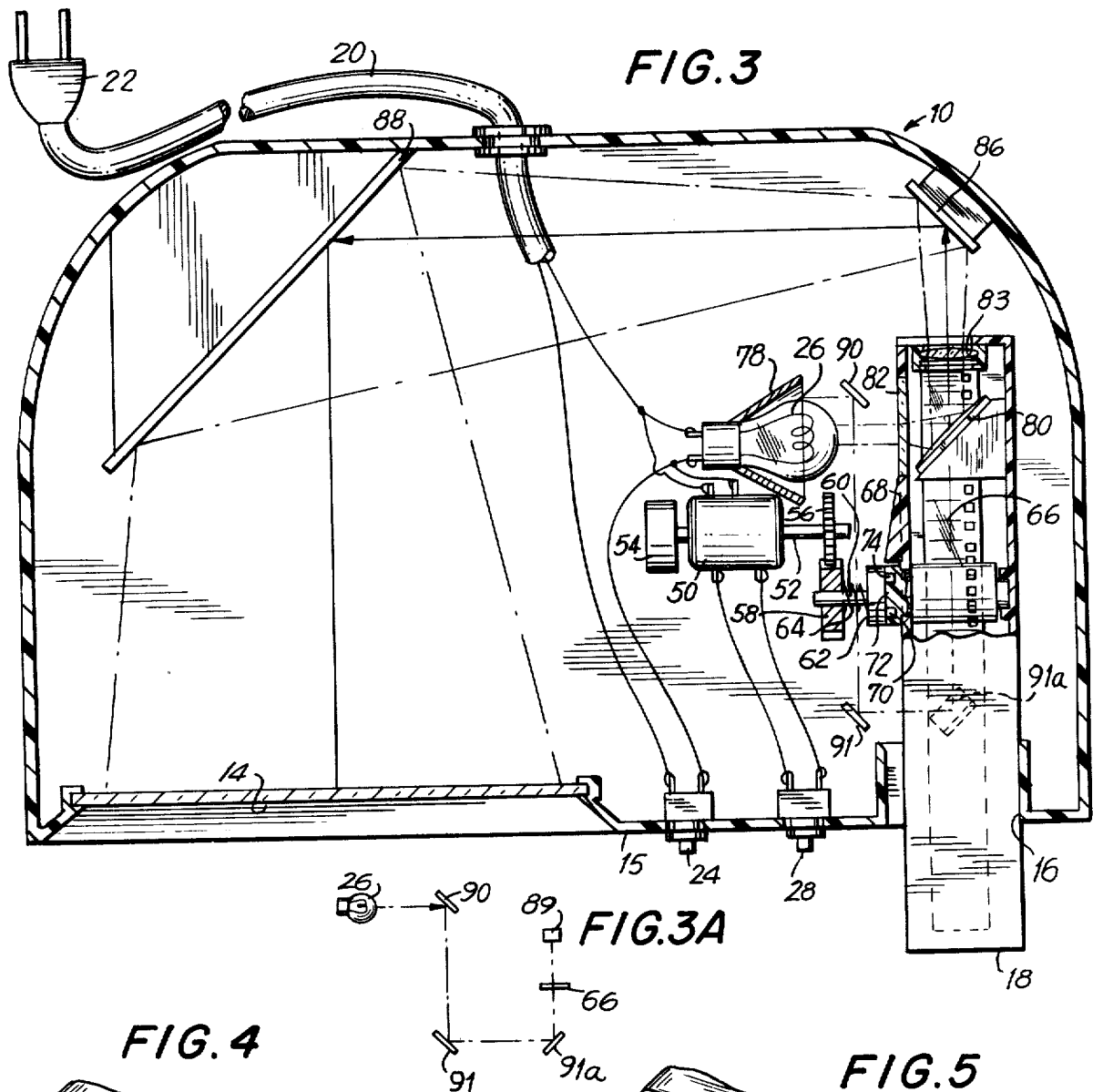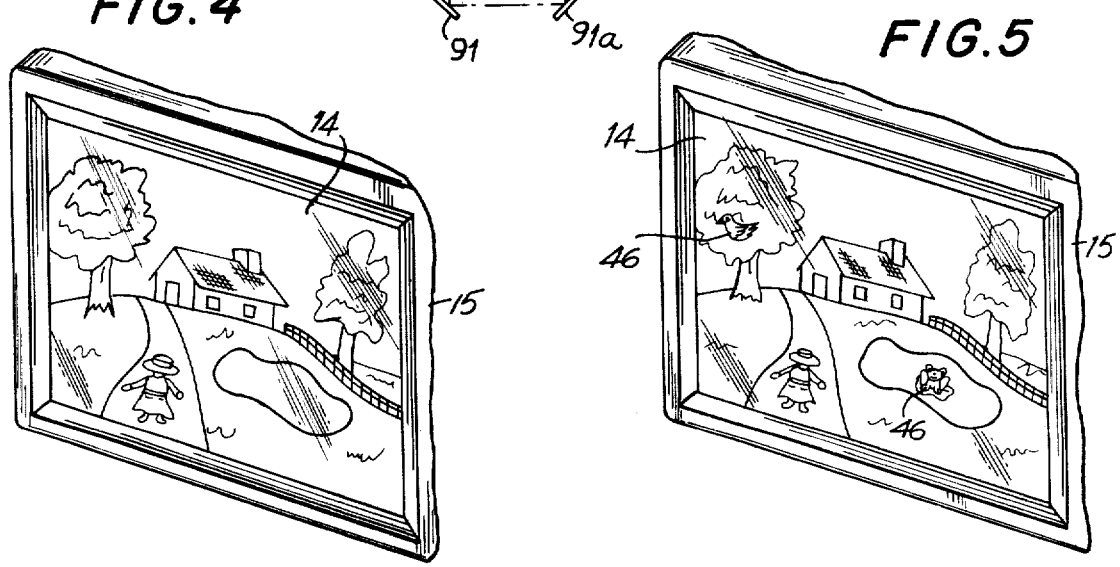

AUDIO-VISUAL, CHILD-PARTICIPATING EDUCATIONAL ENTERTAINMENT CENTER

BACKGROUND OF THE INVENTION

1. Field of the Invention

The present invention relates to an audio-visual, child-participating, educational entertainment center which can be used for educational as well as entertainment purposes.

2. Description of the Prior Art

Already known in the art are children's theatre-type toys. These theatre-type toys provide the child with either a purely visual or an audio-visual story. Generally these toys do not have continuous displays of pictures. Further, the time interval between visual displays is pre-determined and not adjustable by the child. Although satisfactory for some purposes these toys provide no means by which a child can actively participate in the story being presented to him. Additionally, a child can not adjust the pace of the story to correspond to his own pace, desire or needs.

Also known in the art are play kits for coordinated use with a television series. The same are typified by U.S. Pat. No. 3,568,356 issued Mar. 9, 1971. These play kits although providing the child with a means for actively participating in a story do not provide a means for adjusting the pace of the story to the child's own pace. Further, since these kits are for use with a television series the child can only use them when the television series is aired—the child can not freely choose the times the stories are presented.

SUMMARY OF THE INVENTION

1. Objects of the Invention

It is an object of the invention to provide an audio-visual, child-participating, educational entertainment center which is not subject to the drawbacks of the prior art toys.

It is another object of this invention to provide a child-participating, educational entertainment center of the character described which includes a means by which children can regulate the pace of the story being presented.

It is yet another object of this invention to provide a child-participating, educational entertainment center of the character described which allows a child to choose which stories he wants presented at what times.

It is still a further object of this invention to provide a child-participating, educational entertainment center of the character described which is motor-driven, hence allowing a child free use of both hands.

Another object of the invention is to provide a method of amusing a child for extended periods of time without boring him.

Still another object of the invention is to actively involve a child in a story.

It is still a further object of the invention to provide an educational entertainment center of the character described which is usable in conjunction with standard audio-visual playback machines.

Other objects of the invention in part will be obvious and in part will be pointed out hereinafter.

2. Features of the Invention

In keeping with these objects, and others which will become apparent hereinafter, one feature of this invention resides, briefly stated, in an audio-visual, child-participating, educational entertainment center for children which has a screen, a means for continuously displaying a series of visual displays on the screen, a means for continuously generating sounds simultaneously with the visual display, the visual display and the simultaneous sound together providing an audio-visual animated feature; a kit means which includes a plurality of applique devices each of which is adherable to the screen and each of which is capable of integrating with the audio-visual animated feature; and a means for stopping the animated feature at any time to allow the child to apply the applique means to the screen at his own pace and then to restart the animated feature.

In a preferred embodiment, the audio-visual, child-participating, educational entertainment center has a play machine which is capable of simultaneous transmission of sound and picture and, a participation kit for coordinated use with the play machine. The participation kit contains appliques and marking crayons. The play machine contains a switch that enables the child to stop and start the sound and picture on the screen. A plurality of audio-visual tracks can be used with the machine, each track containing a story which is appealing to children and each track being designed so as to encourage the child to participate in the story using the means provided in the participation kit.

In another embodiment, the audio-visual, child-participating, educational entertainment center has a participation kit of the character described above which is capable of coordinated use with a plurality of audio-visual tracks. The audio-visual tracks are replayed on conventional audio-visual playback machines. These playback machines contain on/off switches that enable the child to stop and restart both the sound and the picture.

In this way, a child is provided with an educational entertainment center and a method for learning and entertainment which allows him to actively participate, at his own pace, in animated features. Further, the child can choose what tracks he wants to play with at which times.

BRIEF DESCRIPTION OF THE DRAWINGS

FIG. 3 is a cross-sectional top plan view of the play machine taken along line 3—3 of FIG. 1;

FIG. 3a is a schematic diagram of the pathway by which the audio portion of the audio-visual feature of the present invention is generated;

FIG. 4 & 5 are front views of the screen of the play machine of FIG. 1 showing appliques at different times of application in accordance with the method of this invention.

DETAILED DESCRIPTION OF THE PREFERRED EMBODIMENTS

Figure 1:
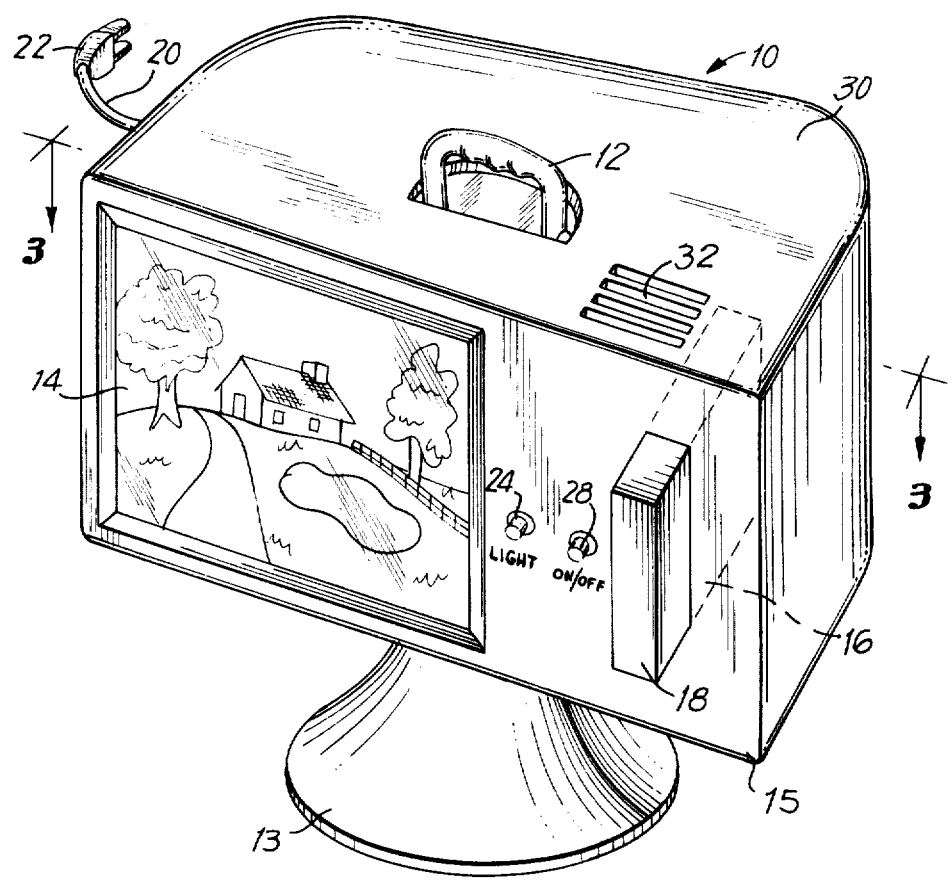
FIG. 1 is a perspective view of a play machine, one of the components of the present invention.

Referring now in detail to the drawings, the reference numeral 10 denotes the audio-visual play machine of the present invention. The play machine 10 is provided with a retractable handle 12 so that a child may easily move the play machine from place to place. The play machine may rest on a base 13 which sits on any appropriate horizontal flat surface, like a table top or a floor.

The play machine has a screen 14 on its front portion 15, on which the visual images are displayed. The machine further has a slot 16 on its front portion 15, in which an audio-visual cartridge 18 can be inserted.

The play machine 10 is provided with an electric cord 20 and plug 22 for insertion into a conventional power outlet. The play machine is further provided with a control switch 24 for turning on and off a projection light 26 (see FIG. 3), and an on/off switch 28 for stopping and restarting the audio-visual feature. Both the light switch 24 and the on/off switch 28 are located on the front portion 15, accessible to a child. The play machine has a top surface 30 in which there are vents 32 from which the sound from the audio-visual feature emanates.

Figure 2:
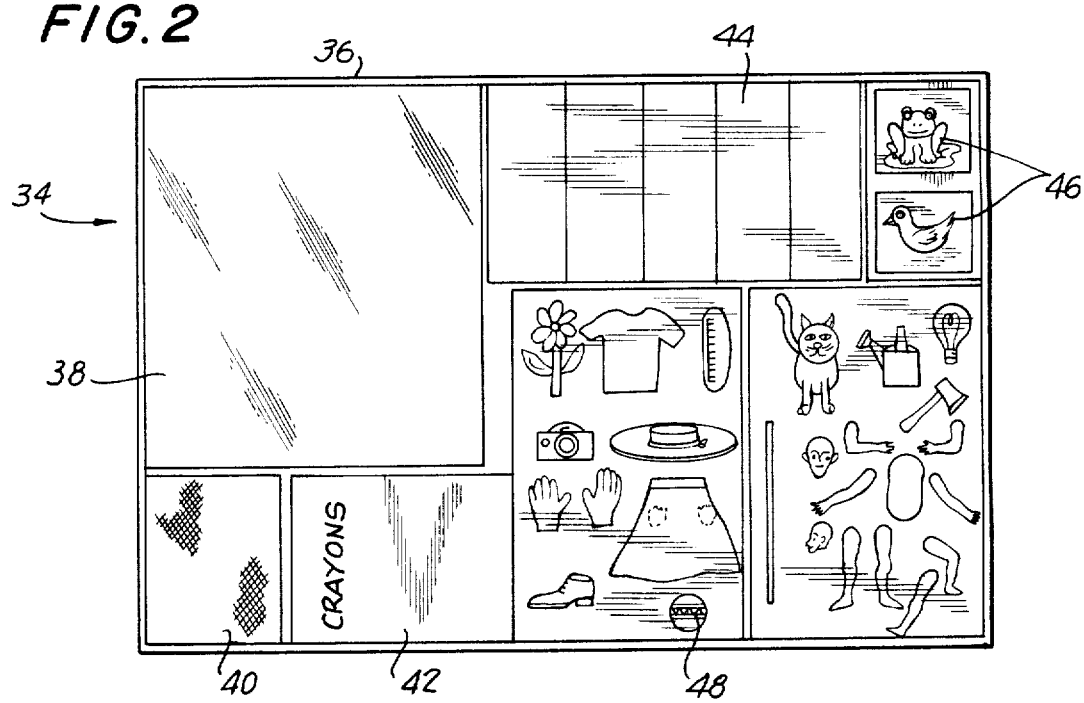
FIG. 2 is a top plan view of a participation kit, another component of the present invention, the kit being illustrated with all the components located in a shallow open-topped box which is the container for the same.

The audio-visual, child-participating, educational entertainment center of the present invention has a participation kit 34 (see FIG. 2) for coordinated use with the play machine 10. The kit includes an open-topped shallow container 36 made of any suitable material.

Located in the container 36 are the sundry components of the participation kit. These sundry components include a transparent panel 38, a wiping cloth 40, a box of crayons 42, several slabs 44 of clay, some open-faced molds 46 and panels 48 of appliques. Not all of these components need be included in the kit, the minimum constituents being the wiping cloth 38, the crayons 42 and the appliques 48. Each of these items is constructed in a certain fashion which enhances both the play value and the educational value of the educational entertainment center.

Referring first to the transparent panel 38, the same is preferably of a size large enough to cover the screen 14 of the play machine 10. The panel is made of a limp, soft, plastic material. A preferred material is polyvinyl chloride. The panel is reasonably thick, e.g. three mils, so that it can assume and retain a substantially flat configuration when placed on the play machine screen. Although the panel is transparent, it has been found that the play value of the kit and the educational entertainment center is enhanced if the panel is lightly tinted. A preferable tint is pink, as a light pink tint lends a somewhat rosy glow to the images viewed. The color of the tint should be so light that it is essentially subliminal.

Both broad surfaces of the panel 38 must be soft and adherent so that when applied to a smooth surface of a similar surface of another plastic sheet, the two will strippably adhere simply upon being placed together.

The panel 38, while adding an extra measure of protection for the play machine screen 14 is not a necessary component of the center, as all other components of the participation kit may be used directly upon the play machine screen without use of the panel 38.

The wiping cloth 40 is of any bibulous soft fibrous material. A preferred cloth is flannel.

The crayons 42 are characterized by the feature that they leave a marking that can be wiped off easily by a water-dampened cloth or a dry cloth. An ordinary wax crayon does not have this characteristic. Such a standard crayon is not suitable for use with the present invention since a marking from it would not adhere well to either the panel 38 or the screen 14 and could not be conveniently removed from either.

The crayons 42 which are of assorted colors, may be, pursuant to the present invention, made up of the following constituents:

| Ingredient | Range of parts by weight | Preferred parts by weight |
|---|---|---|
| Paraffin wax (fully refined and having an oil content of less than ½% and a melting point of 143° to 145° F.) | 150–220 | 180 |
| Stearic acid (coupling agent) | 5–25 | 15 |
| Surface active agent | 5–25 | 18 |
| Microcrystalline wax (melting point 180° F.) | 3–12 | 7½ |
| Petrolatum (amber) | 3–20 | 10 |
| Pigment | 5–15 | 10 |

The surface active agent lowers the surface tension of the wax film applied to the panel in the use of the crayon and thereby makes the film water-dispersable when wiped under light pressure by a water-dampened cloth or the like. The petrolatum functions as a lubricating agent and imparts a greasy characteristic to a wax film left by the crayon so as to facilitate the ability of the thin applied wax layer to be wiped off the panel 38 with a dry cloth or the like. The presence of the petrolatum and the surface active agent somewhat soften the paraffin wax which is the carrier and main constituent of the crayon and in order to restore the desired degree of hardness so that the crayon will not soften and be distorted by body heat when held in a child's hand, the microcrystalline wax is incorporated, this latter wax being a hardening agent.

The preferred surface active agent is an 85% active (15% inert) polypropylene glycol ether of a block polymer of about 50% propylene oxide and 50% ethylene oxide having a molecular weight of about 3,000.

The particular type of surface active agent is not critical to the practice of the invention, that is to say, cationic, anionic and non-ionic surfactants and blends thereof can be used.

The slabs 44 of clay are formed of a standard non-hardening clay material which is conventional in the art. The different slabs, preferably, are differently colored.

The molds 46 are in the form of open-topped shallow trays, the sides and bottom of each which is formed with a contour in the shape of some article to be associated with the audio-visual feature. The molds can be made from any suitable material.

The appliques 48, like the panel 38, are formed of a limp, soft sheet material. Desirably, this material is compatible with the material of the panel 38. Preferably, the appliques are made sufficiently heavy, so that they can be handled with ease by a child.

The appliques are provided with two broad surfaces which are strippably adherent to the panel 38 and screen 14 so that they are reversible.

As best seen in FIG. 3, the play machine 10 is driven by an electrical motor 50 which has an output shaft 52. At one end of the output shaft 52, mounted for joint movement, is a flywheel 54. The flywheel maintains the speed of the audiovisual feature constant when in operation so that same is not affected by voltage fluctuations in the power supply.

At the opposite end of the output shaft are a pair of speed reducing transmission gears 56 and 58. Gear 56 drivingly meshes with gear 58. Gear 58 is mounted on an auxiliary shaft 60. Axially shiftable on the opposite end of shaft 60 is a drive coupling member 62, which is resiliently biased away from gear 58 by a coil spring 64 which surrounds the auxiliary shaft 60.

As noted above, the cartridge 18 is inserted through the slot 16 formed at the front of the machine. The cartridge contains a closed loop of conventional audio-visual film 66 having a sound track. A wedge-shaped piloting rib 68 is provided on one side of the cartridge 18 to retract the drive member 62 preliminary to its engagement with a driven coupling member 70. The driven coupling member has a plurality of equi-angularly spaced sockets 72 which are adapted to receive corresponding pins 74 on the driving coupling member 62.

The driven member 70 is rotatably mounted on a side of the cartridge 18. It is operatively coupled to the film 66 so as to drive the latter in a predetermined path within the cartridge.

The visual portion of the audio-visual feature is read through conventional visual means. The play machine is provided with the afore-mentioned projection lamp 26 having an associated parabolic reflector 78.

As the sequential frames of film travel through a predetermined endless path, they pass in front of a convex mirror 80. Light emanating from the projection lamp 26 after striking the parabolic reflector 78, proceeds through a transparent dust-proofing pane 82, in the side of the audio-visual cartridge 18, and is reflected off the mirror 80. The light rays then travel through the film which modulate them, and immediately pass through a diverging lens 83. The diverging light rays then impinge upon a second mirror 86 and are further reflected onto a main mirror 88. From the main mirror the light rays are transmitted forwardly onto the frosted rear surface of the play machine screen 14. In this manner the visual portion of the audio-visual feature is displayed upon the screen for viewing by a child.

The audio portion of the audio-visual feature is likewise generated in a conventional manner. The play machine is provided with an audio head 89 which rides on the film to read the audio track and produce an audio electric signal. The electric signal is fed to a conventional speaker (not shown) below vents 32. In this manner a sound synchronized with the video display is made audible to the child. The light from lamp 26 is utilized in reading the audio portion of the feature. It impinges on a mirror 90 and is reflected onto a mirror 91. From mirror 91 the light rays are reflected onto a mirror 91a which in turn reflects said light through the sound track, which modulates said light. The modulated light emerges from the track where it is read by audio head 89.

The play machine 10 is provided, as mentioned above, with both an on/off switch 28 and a light switch 24. The light switch turns the projection lamp 26 on and off so that the visual portion of the audio-visual feature may be projected onto the screen for viewing by the child. The on/off switch 28 provides the child with a means of stopping and restarting the audio-visual feature. As best seen in FIG. 3, the play machine is so wired as to provide a safety feature whereby the play machine cannot be turned on unless the light is on. In this manner a child cannot inadvertently leave the machine on because he will know whether the machine is on due to the light.

As will become clearer later on, the on/off switch provides the child with a way of adjusting the pace of the story being presented to him so that he may utilize the components of the participation kit 34 at his or her own speed. This is of particular advantage to children with handicaps, because they are not restricted to playing at a predetermined pace.

The participation kit 34 is susceptible to a wide variety of uses in conjunction with the audio-visual feature. In general, the idea is that a scene will be shown on the play machine screen 14, preferably a colored scene. The scene will include one or more background sets, and from time to time characters and articles will appear on the screen. The characters will move about, possibly not continuously, but from time to tome. Also, the characters will speak or there will be a commentary by a narrator. Objects which are not actually articulate, for example animals, will be permitted to talk to enhance the imaginative value of the game. The characters may be of the cartoon type or pictures of actual subjects.

The general purpose of the educational entertainment center of the present invention, is to permit a child to become an active participant, at his or her own pace, in the feature which is being watched on the screen. The child participates in the action by manually performing various acts which will become obvious to him as he watches and listens to the feature which is progressing on the screen. Thus, a character may say, "now I will put on my glove." The child, on hearing this, will take a glove applique from its supportive panel and place it on the character's hand. Because the child may stop the action on the machine utilizing the on/off switch 28, he may take as long as he wishes to perform this action. The child will see the character on the screen or through the transparent panel 38 which he has applied to the screen if he so desired. The child may restart the feature utilizing the on/off switch whenever he wants to. Due to the tacky surface on the appliques, the child has no difficulty in adhering the applique either to the screen 14 or to the panel 38.

It may be that the action directed is such that the child will place a character on the screen against the background set which is part of the feature, in which case the child will assemble the parts of the character and superimpose them on the screen.

Thus, the narrator may say, "now Jane Jenkins runs on the driveway;" in which case the child will take the appliques resembling a head, a torso, a pair of arms, and a pair of legs, and place them on the driveway, assembling them in such a position as to create a realistic little girl on the screen.

Another possibility is that the character on the screen may say "a bird just landed on the tree." This will be a signal for the child to take a piece of clay from one of the slabs 44 and press it into the bird mold, forming a bird, which he then pulls out and sets onto the tree, which is a part of the background set, projected onto his play machine screen.

It will be apparent that there are an infinite variety of scenarios and actions so that a child's interest will be held from day to day, week to week, and month to month over an extended period of time.

The actions in the feature may be such that the task the child must perform involves drawing items onto the screen. For example, the narrator might say "now Jane Jenkins is playing jump rope." The child can then, using the crayons provided, carefully draw a jump rope for Jane Jenkins to play with. It will be recalled that the markings left by the crayons can be easily removed by wet or dry wiping.

In FIG. 1 there is illustrated a typical background set on the play machine screen 14. By way of example, there are illustrated in FIGS. 4 & 5, a successive series of view of the play machine screen 14 with certain objects and actions shown thereon.

Figure 6:
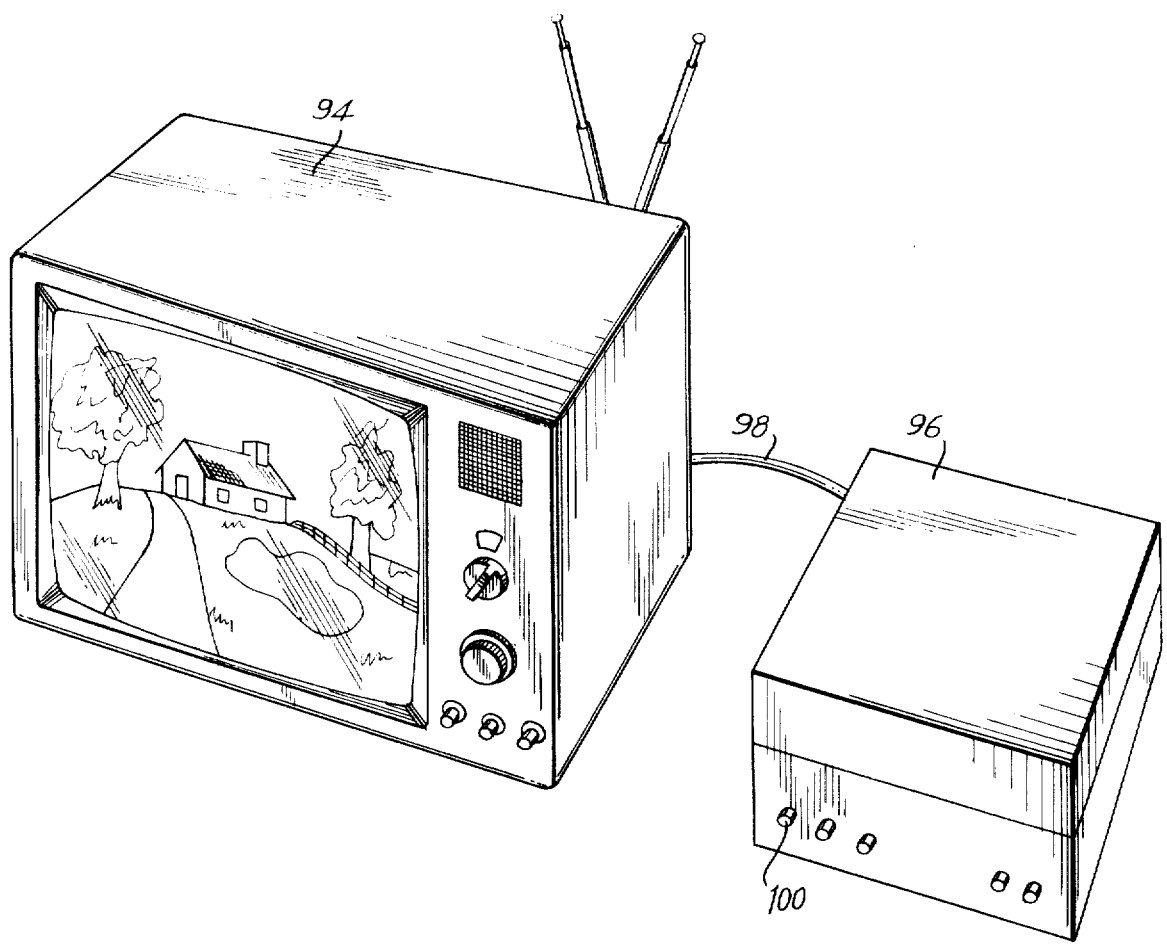
FIG. 6 is a perspective view of an alternative embodiment showing a conventional television set hooked up to a conventional audio-visual replay machine for use with the participation kit of this invention.

As best seen in FIG. 6, in an alternative embodiment of the present invention, the participation kit 34 may be used in conjunction with a conventional television set 94 and a conventional audio-visual replay machine 96. Any conventional audio-visual replay machine may be utilized, e.g. any of the audio-visual tape machines of either the Beta or VHS format or any of the audio-visual disc machines. Some examples of audio-visual replay machines that may be used with the present invention are the "Sony Betamax 5400," the "RCA Selectavision," the "Pioneer Laser Disc," and the "Magnavox Disc Machine." The machines mentioned are exemplificative and are not meant to provide an exclusive list of the audio-visual machines that may be used with the kit of this invention.

The audio-visual feature is contained on either a tape or a video-disc. The tape or video-disc is inserted in the replay machine 96. The replay machine 96 is connected to a conventional television set 94 through wires shown in FIG. 6 as contained in a cable 98. The replay machine 96 includes a stop-start button 100 which the child can utilize to stop and restart both the audio and visual portions of the feature. It is also possible to initially record the audio-visual feature with a series of frozen frames therein. The frozen frames in effect, stop the audio-visual feature for a predetermined length of time. The participation kit 34 is used with a conventional television set 94 connected to the conventional replay machine 96, in the same manner it is used with the play machine 10 as heretofore described.

By utilizing the kit 34 in connection with a standard television set 94 connected to a standard replay machine 96, it is possible to use the educational entertainment center of this invention in a classroom. There, each child can be provided with his own television and replay machine. The entire class may watch and participate in a feature under the guidance of a teacher. It is also possible to coordinate the audio-visual features with books that the children may take home and work with. The child may watch and participate in an animated feature shown in school and then be assigned homework in a book which is also coordinated with the audio-visual feature. In this way, homework is used to reinforce what the child has learned in school.

Further, the use of the participation kit 34 with a conventional television set and conventional replay machine makes it possible for the child to re-watch in his home, the features he has seen at school. There is no need for a special home machine for the child use and hence, no extra expense. The kit with its coordinated audio-visual features may be used in conjunction with the television set and replay machine that a family normally uses. It is thus possible for a child to borrow from school the audio-visual features he has used in the classroom and review them in his home.

It will be appreciated that an advantage of this educational entertainment center is that the child may watch whatever audio-visual feature he desires, at whatever time he wishes; hence, a child is not confined to the predetermined time periods of certain television shows. Further, a child may play the same feature over again as often as he wishes. This is particularly intriguing to small children who enjoy repetitive amusement games. It also allows the child to view each track as many times as he needs in order to understand the lesson on each track. Thus for both entertainment and educational purposes, this feature of the invention is advantageous, in that it allows each child to learn and play at his own pace.

As previously mentioned, another advantageous feature of this invention is that the child, utilizing the on/off switch 28 of the machine 10 or the on/off switch 100 of the replay machine 96, may stop the feature and restart the feature whenever he so chooses. This allows the child as much time as he desires to use the participation kit components. It also allows the child to experiment utilizing different components of the kit on the same scene so that he might decide which component he feels fits best in each scene. In this manner, a child is encouraged to develop a sense of taste and propriety.

It thus will be seen that there are provided a play machine or replay machine and connected television set with a coordinated participation kit and a method of using same which achieve the several objects of this invention and which are well adapted to the conditions of practical use.

It will be understood that each of the elements described above, or two or more together, may also find a useful application in other types of constructions differing from the types described above.

While the invention has been illustrated and described as embodied in an audio-visual, child-participating educational entertainment center, it is not intended to be limited to the details shown, since warious modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An audio-visual, child-participating, educational entertainment center, comprising:
 (a) a screen;
 (b) kit means including a plurality of applique means each being strippably adherable to the screen when applied thereto;
 (c) video means for displaying a series of sequential visual displays on the screen to constitute an animated feature which is viewable by a child;
 (d) audio means for generating sound accompaniment for the animated feature, said sound accompaniment including narrated instructions directing the child to apply the applique means to the screen; and
 (e) pace-setting means for stopping the sound accompaniment and animated feature at any desired one of the visual displays for a variable time interval, each time interval being different for each child and being dependent on the level of skill of the respective child, said time interval being of time duration sufficient to permit the respective child to apply the applique means to the stopped visual display displayed on the screen at his or her own pace in accordance with the narrated instructions, said pace-setting means being further operative for thereafter restarting the animated feature and sound accompaniment when the child has completed the application of the applique means to the screen, whereby each child can interact with the narrated instructions at his or her own pace.

2. The center as defined in claim 1, wherein said pace-setting means includes a stop/start switch actuatable between a stop condition which defines the beginning of said time interval, and a restart condition which defines the end of said time interval.

3. The center as defined in claim 1; and further comprising wiring means for electrically connecting the pace-setting means to the video means such that the pace-setting means is operative only after the video means has been operated.

4. The center as defined in claim 3, wherein said video means includes a light source, and wherein said pace-setting means includes a stop/start switch and a motor-operated drive, and wherein said drive is only operative by the stop/start switch if the light source has been illuminated.

5. The center as defined in claim 1, wherein said kit means includes water dispersable dry wipe-offable crayons adapted to be applied to the screen.

6. The center as defined in claim 1, wherein said kit means includes a transparent protective panel strippably self-adherent to the screen when applied thereto.

7. The center as defined in claim 1, wherein said video means includes a film cartridge insertable into a receiving slot of the entertainment center.

8. An audio-visual, child-participating, educational entertainment center, comprising:
   (a) a self-standing housing having a receiving slot and a screen;
   (b) kit means including a plurality of applique means, each being strippably adherable to the screen when applied thereto, and a plurality of water dispersable dry wipe-offable crayons, each being applicable to the screen;
   (c) video means including a light source, and a film cartridge insertable into the receiving slot, said film cartridge having a film movable past the light source to project a series of sequential visual displays on the screen to constitute an animated feature which is viewable by a child;
   (d) audio means for generating sound accompaniment for the animated feature, said sound accompaniment including narrated instructions directing the child to apply the applique means and the crayons to the screen; and
   (e) pace-setting means for stopping the sound accompaniment and animated feature at any desired one of the visual displays for a variable time interval, each time interval being different for each child and being dependent on the level of skill of the respective child, said time interval being of duration sufficient to permit the respective child to apply the applique means and crayons to the stopped visual display displayed on the screen at his or her own pace in accordance with the narrated instructions, said pace-setting means being further operative for thereafter restarting the animated feature and sound accompaniment when the child has completed the application of the applique means and crayons to the screen, said pace-setting means including a stop/start switch and a motor-operated drive operative for stopping the film in a stop condition which defines the beginning of said time interval, and for moving the film past the light source in a restart condition which defines the end of said time interval, whereby each child can interact with the narrated instructions at his or her own pace.

9. A method of educating and entertaining children, comprising the steps of:
   (a) strippably adhering any number of a plurality of appliques to a screen;
   (b) displaying a series of sequential visual displays on the screen to constitute an animated feature which is viewable by a child;
   (c) generating sound accompaniment for the animated feature, and also generating narrated instructions for directing the child to strippably adhere the appliques to the screen; and
   (d) adjusting the pace by which the child interacts with the narrated instructions by stopping the sound accompaniment and animated feature at any desired one of the visual displays for a variable time interval, each time interval being different for each child and being dependent on the level of skill of the respective child, said time interval being of time duration sufficient to permit the respective child to adhere the applique means to the stopped visual display displayed on the screen at his or her own pace in accordance with the narrated instructions, and by thereafter restarting the animated feature and sound accompaniment when the child has completed the adherence of the applique means to the screen.

* * * * *